(12) United States Patent
Hahn et al.

(10) Patent No.: US 8,538,025 B2
(45) Date of Patent: Sep. 17, 2013

(54) SECURITY PERFORMANCE NEGOTIATION METHOD AND A TEK MANAGEMENT METHOD

(75) Inventors: Gene Beck Hahn, Anyang-si (KR); In Uk Jung, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 22 days.

(21) Appl. No.: 13/203,452

(22) PCT Filed: Feb. 18, 2010

(86) PCT No.: PCT/KR2010/001013
§ 371 (c)(1),
(2), (4) Date: Aug. 25, 2011

(87) PCT Pub. No.: WO2010/098551
PCT Pub. Date: Sep. 2, 2010

(65) Prior Publication Data
US 2011/0305341 A1    Dec. 15, 2011

Related U.S. Application Data

(60) Provisional application No. 61/155,518, filed on Feb. 26, 2009.

(30) Foreign Application Priority Data
Jul. 20, 2009    (KR) .................. 10-2009-0065818

(51) Int. Cl.
*H04L 9/00*    (2006.01)
(52) U.S. Cl.
USPC ........................................... 380/272; 726/36

(58) Field of Classification Search
USPC ............................................................. 380/272
See application file for complete search history.

(56) References Cited

U.S. PATENT DOCUMENTS

| 2004/0101125 A1* | 5/2004 | Graf et al. ................. 379/229 |
| 2010/0190500 A1* | 7/2010 | Choi et al. ................ 455/436 |
| 2011/0274034 A1* | 11/2011 | Rautiola et al. .......... 370/328 |

FOREIGN PATENT DOCUMENTS

| KR | 10-2002-0065532 A | 8/2002 |
| KR | 10-2007-0061409 A | 6/2007 |
| KR | 10-2007-0108038 A | 11/2007 |

OTHER PUBLICATIONS

David Johnson, Overview of IEEE 802.16 security; May/ Jun. 2004; pp. 1-9.*

* cited by examiner

*Primary Examiner* — Mohammad W Reza
*Assistant Examiner* — Monjour Rahim
(74) *Attorney, Agent, or Firm* — McKenna Long & Aldridge LLP

(57) ABSTRACT

The present invention relates to methods for sending and receiving security related information during handover on a wireless access system and methods for managing a traffic encoding key (TEK). In one example of the present invention, a security performance negotiation method for supporting the hand-over of mobile handsets comprises the steps of: carrying out, in advance, a security performance negotiation procedure with a first base station (T-ABS), prior to registration on the first base station; generating a traffic encoding key (TEK) by using security related information acquired by means of the security performance negotiation procedure; and carrying out a general performance exchange procedure encoded by means of the TEK and a zone switch with the first base station.

14 Claims, 12 Drawing Sheets

FIG. 3
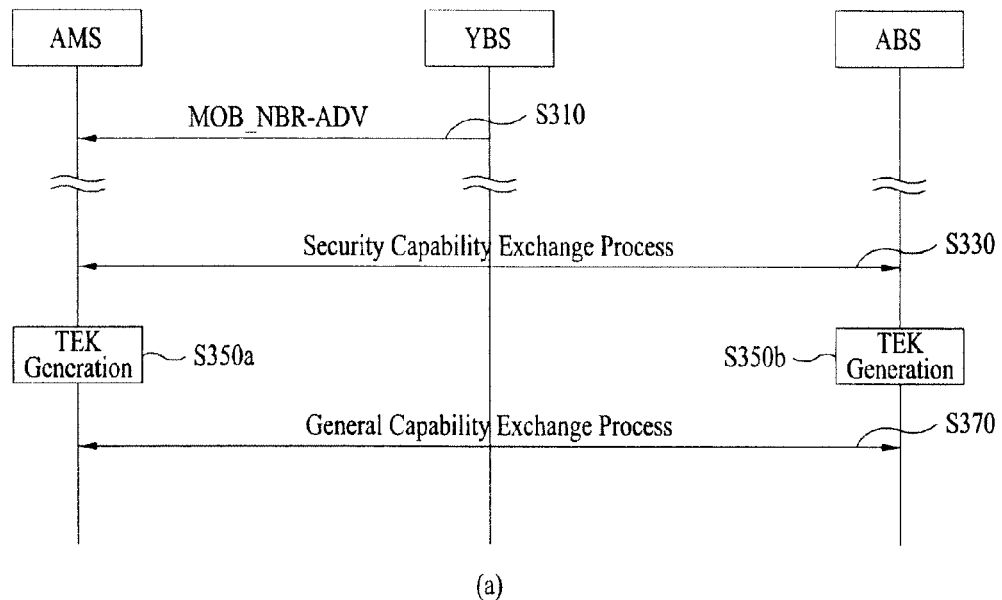
(a)
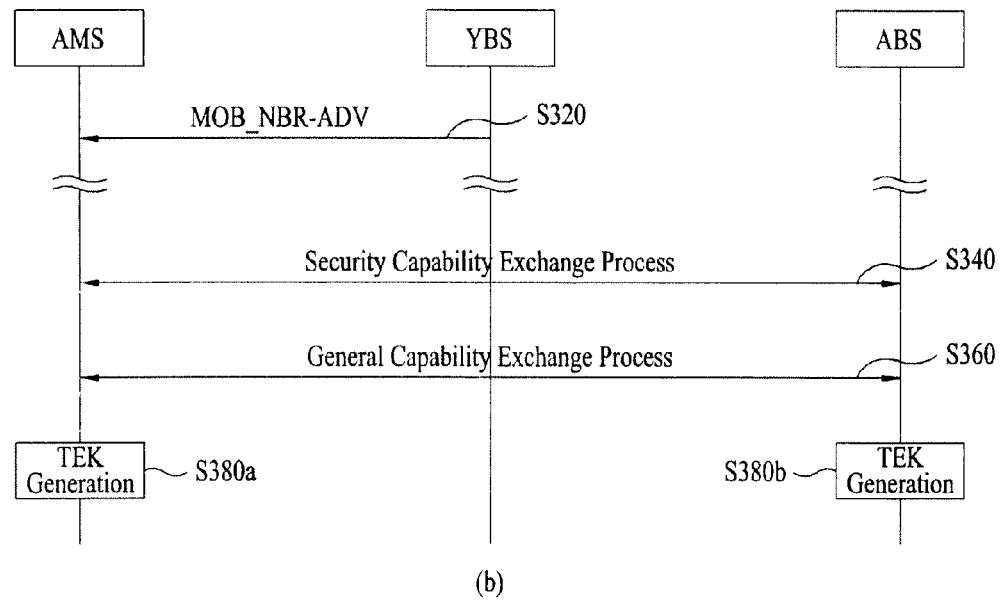
(b)

SECURITY PERFORMANCE NEGOTIATION METHOD AND A TEK MANAGEMENT METHOD

This application is a 35 U.S.C. §371 National Stage entry of International Application No. PCT/KR2010/001013, filed on Feb. 18, 2010, and claims the benefit of priority of U.S. Provisional Application No. 61/155,518 filed Feb. 26, 2009, and Korean Patent Application No. 10-2009-0065818, filed Jul. 20, 2009, each of which are hereby incorporated by reference in their entireties as if fully set forth herein.

TECHNICAL FIELD

The present invention relates to a security capability negotiation method and apparatus during handover in a wireless access system. Also, the present invention relates to a method and apparatus for managing a Traffic Encryption Key (TEK) during handover.

BACKGROUND ART

In an IEEE 802.16e system network which is being used, capability negotiation is performed between a Mobile Station (MS) and a Base Station (BS) after an initial ranging procedure during initial network entry. The capability negotiation is carried out during initialization of the MS by transmitting and receiving a Subscriber Station Basic Capability Request (SBC-REQ) message and a Subscriber Station Basic Capability Response (SBC-RSP) message.

If the MS performs handoff to another BS after entering a network, the MS may acquire System Information (SI) of a handover target BS through Downlink Channel Descriptor (DCD)/Uplink Channel Descriptor (UCD) information of a neighbor BS advertisement (MOB_NBR-ADV) message of a serving BS.

The MS performs negotiation about a security procedure for handoff optimization during ranging with the target BS. Accordingly, additional security negotiation through the SBC-REQ message and the SBC-RSP message need not necessarily be performed.

However, if the handover target BS is different in capability from the serving BS, it is desirable that the handover target BS inform the MS of capability elements which should be additionally updated, through a ranging response (RNG-RSP) message in a handover ranging process with the MS.

DETAILED DESCRIPTION OF THE INVENTION

Technical Problems

When an Advanced Mobile Station (AMS) performs handover to an Advanced Base Station (ABS) while being served by a Yardstick Base Station (YBS) which is a legacy BS, handover procedures of two scenarios may be implemented.

One scenario is as follows. If a handover target ABS (i.e. target BS) supports a legacy system, the AMS performs an handoff procedure of IEEE 802.16e to a Legacy Zone (LZone) of the target ABS and thereafter performs zone switch to an IEEE 802.16m zone (MZone), thereby completing a handover procedure.

The other scenario is as follows. If the handover target ABS does not support a legacy system, the ABS does not support zone switch. Accordingly, the AMS performs handoff directly to the MZone of the ABS.

When handover is performed from the YBS to the ABS of an 802.16m network, the AMS and the ABS should have a capability negotiation process because they know nothing of each other's capabilities. To this end, it is desirable for the AMS and the target ABS to previously negotiate security capabilities and to generate a TEK based on the security capabilities.

In a legacy system (e.g. IEEE 802.16e system), a target BS may inform an MS of capabilities which are different from those of a serving BS, and the serving BS and the target BS may share capabilities of the MS. However, if handover is performed between a BS supporting a legacy system and a BS supporting an evolved system (e.g. IEEE 802.16m system), an MS should again perform negotiation about all capabilities of the evolved system from the beginning.

Further, a capability negotiation process should be carried out when an AMS supporting IEEE 802.16m performs handover to an ABS supporting IEEE 802.16m in an IEEE 802.16e network, or perform handover from the ABS supporting IEEE 802.16m to a BS supporting a legacy system. However, a capability negotiation method for such handover and a TEK management method have not been definitely defined yet.

The present invention has been made to satisfy the requirements for solving the above-described general technical problems, and it is an object of the present invention to provide a method for effectively performing handover to support a legacy system.

It is another object of the present invention to provide a security capability negotiation method between an AMS and an ABS supporting a legacy system and a TEK management method, which should be performed prior to a capability negotiation process between the AMS and the target ABS.

It is a further object of the present invention to provide a security capability negotiation process based on different types of security capability negotiation and TEK setting, when handover is performed between networks supporting different systems.

The technical objects to be solved by the present invention are not limited to the above-mentioned technical objects, and other technical problems not mentioned above can be clearly derived and understood by one skilled in the art from the embodiments of the present invention which will be described hereinbelow.

Means for Solving Problems

To solve the above technical problems, the present invention discloses methods for transmitting and receiving security information during handover in a wireless access system. The present invention also discloses methods for managing a TEK during handover.

As a first embodiment of the present invention, a security capability negotiation method for supporting handover of a mobile station includes performing a security capability negotiation procedure with a first base station (T-ABS) prior to registration in the first base station, generating a Traffic Encryption Key (TEK) using security related information obtained through the security capability negotiation procedure, and performing zone switch at the first base station and a general capability exchange procedure encrypted through the TEK with the first base station.

In the first embodiment, the security capability negotiation method may further include receiving a neighbor base station advertisement (MOB_NBR-ADV) message including a base station identifier (BS ID) of the first base station from a second base station (YBS) which is a serving base station, and generating an Authentication Key (AK) using the BS ID of the first base station.

In the first embodiment, the security capability negotiation procedure may include steps of transmitting a ranging request message, which includes security capability information and security negotiation parameters supported by the mobile station, to the first base station, and receiving a ranging response message, which includes security capability information, security negotiation parameters, and nonce supported by the first base station, from the first base station. The mobile station may generate the TEK using one or more of the AK, the BS ID of the first base station, the nonce, a key count, and a Security Association ID (SAID).

The general capability exchange procedure may include steps of transmitting information including an indicator indicating whether the zone switch is performed to the first base station; receiving an uplink grant message, which includes uplink resource allocation information for performing the general capability exchange procedure and a temporary station ID; transmitting a general capability request message through an uplink zone indicated by the uplink resource allocation information, and receiving a general capability response message including a station ID of the first base station.

As a second embodiment, a security capability negotiation method for supporting handover of a mobile station at a first base station which is a target base station includes steps of: performing a security capability negotiation procedure with the mobile station before the mobile station which is to perform handover is registered in the first base station; generating a Traffic Encryption Key (TEK) using security related information obtained in the security capability negotiation procedure; and performing zone switch and a general capability exchange procedure encrypted through the TEK with the mobile station.

In the second embodiment, the security capability negotiation method may further include generating an Authentication Key (AK) using a base station identifier (BS ID) of the first base station.

The security capability negotiation procedure may include steps of: receiving a ranging request message, which includes security capability information and security negotiation parameters supported by the mobile station, from the mobile station; and transmitting a ranging response message, which includes security capability information, security negotiation parameters, and nonce supported by the first base station, to the mobile station.

In generating of the TEK in the second embodiment, the first base station may generate the TEK using one or more of the AK, the BS ID of the first base station, the nonce, a key count, and a Security Association ID (SAID).

The general capability exchange procedure may include steps of receiving information including an indicator indicating whether the zone switch is performed from the mobile station; transmitting an uplink grant message, which includes uplink resource allocation information for performing the general capability exchange procedure and a temporary station ID to the mobile station receiving a general capability request message through an uplink zone indicated by the uplink resource allocation information from the mobile station; and transmitting a general capability response message including a station ID of the first base station to the mobile station.

As a third embodiment, a mobile station for security capability negotiation during handover includes a transmission module for transmitting radio signals, a reception module for receiving radio signals, and a processor for controlling a security capability negotiation procedure with a first base station and generating a traffic encryption key (TEK) obtained through the security capability negotiation procedure.

The processor may perform a security capability negotiation procedure with a first base station prior to registration in the first base station, generates a Traffic Encryption Key (TEK) using security related information obtained through the security capability negotiation procedure, and performs zone switch and a general capability exchange procedure encrypted through the TEK with the first base station.

The above first to third embodiments are merely a part of the preferred embodiments of the present invention, and various embodiments on which technical features of the present invention are reflected can be derived and understood by the person with ordinary skill in the art based on the following detailed description of the present invention, which will be described later. In other words, the following detailed description not only supports the above first to third embodiments but also may show new embodiments by deriving from the first to third embodiments or combining steps of the first to third embodiments.

Effects of the Invention

According to the embodiments of the present invention, the following effects are obtained.

First, the embodiments of the present invention provide an effective handover execution method from a legacy system to an evolved system.

Second, the embodiments of the present invention provide a security capability negotiation method between an AMS and an ABS supporting a legacy system and a TEK management method, which should be performed prior to a capability negotiation process between the AMS and the target ABS Third, a security capability negotiation process is performed based on different types of security capability negotiation and TEK setting, when handover is performed between networks supporting different systems.

The effects of the present invention are not limited to the above-mentioned effects, and other effects not mentioned above can be clearly derived and understood by one skilled in the art from the following description of the embodiments of the present invention.

BRIEF DESCRIPTION OF THE DRAWINGS

FIG. 3 is diagrams illustrating methods for exchanging security capabilities and general capabilities between an MS and a TBS in a handover process according to an embodiment of the present invention;

BEST MODE FOR CARRYING OUT THE INVENTION

Figure 1:
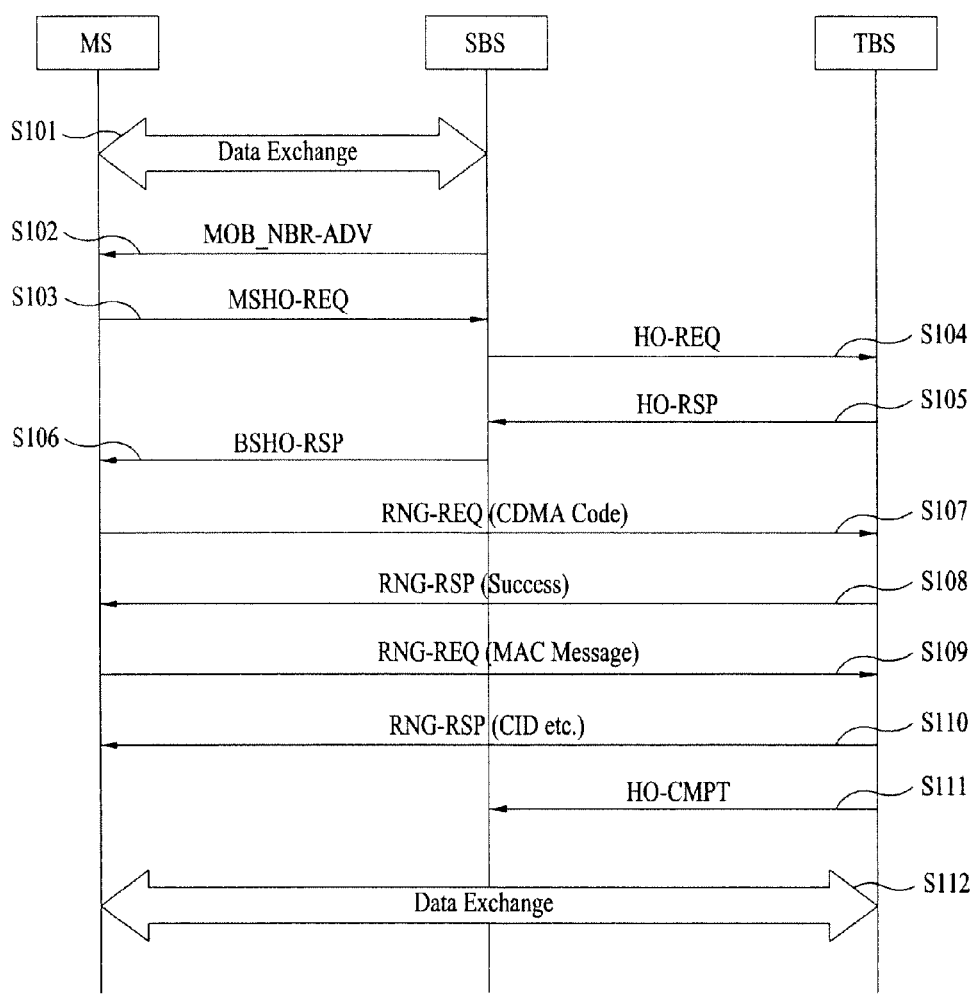
FIG. 1 is a diagram illustrating one of handover processes.

The present invention relates to a wireless access system. The present invention discloses methods for transmitting and receiving security related information during handover in a wireless access system. Also, the present invention discloses methods for managing a TEK during handover.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may obscure the subject matter of the present invention will not be disclosed. Also, procedures or steps that may be understood by a person with ordinary skill in the art will not be disclosed.

The embodiments of the present invention have been described based on data transmission and reception between a base station and a mobile station. In this case, the base station means a terminal node of a network, which performs direct communication with the mobile station. A specific operation which is described as being performed by the base station may be performed by an upper node of the base station.

In other words, various operations performed for communication with the mobile station in the network which includes a plurality of network nodes along with the base station may be performed by the base station or network nodes other than the base station. The Base Station (BS) may be replaced with term such as fixed station, Node B, eNode B (eNB), Advanced Base Station (ABS), or Access Point (AP). Also, the Mobile Station (MS) may be replaced with term such as User Equipment (UE), Subscriber Station (SS), Mobile Subscriber Station (MSS), Mobile Terminal (MT), Advanced Mobile Station (AMS), or terminal.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention can be supported by the above standard documents. Also, all terms disclosed herein can be described by the above standard documents. Particularly, the embodiments of the present invention can be supported by one or more of standard documents of an IEEE 802.16 system, i.e., P802.16-2004, P802.16e-2005, and P802.16-2009.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are provided to assist in understanding of the present invention, and various modifications can be made to the specific terms within the range that they do not depart from the technical spirit of the present invention.

In the embodiments of the present invention to be described, it is assumed that a legacy system denotes a 3GPP LTE system or an IEEE 802.16e system and an evolved system denotes a 3GPP LTE-A system or an IEEE 802.16m system.

FIG. 1 is a diagram illustrating one of handover processes.

FIG. 1 illustrates a general handoff procedure defined in IEEE 802.16e. An MS may be registered in a Serving Base Station (SBS) to transmit and receive data (step S101).

The SBS may periodically broadcast information about neighbor BSs existing within its coverage through an MOB_NBR-ADV message (step S102).

The MS starts scanning for neighbor BSs using a handover (HO) trigger condition while communicating with the SBS. When a scanning value exceeds a hysteresis margin, the MS requests HO procedure execution by transmitting an HO request (MSHO-REQ) message including a candidate HO BS field to the SBS (step S103).

Upon receiving the MSHO-REQ message, the SBS informs candidate HO BSs included in the MSHO-REQ message that the MS has requested handover, through an handover request (HO-REQ) message (step S104).

The candidate HO BSs transmit information about HO to the SBS through an handover response (HO-RSP) message, for the MS having requested HO (step S105).

The SBS transmits the information about HO included in the HO-RSP message to the MS through an HO response (BSHO-RSP) message. The BSHO-RSP message may include information necessary to perform HO, such as a handoff action time, an HO identifier (HO-ID), and a dedicated HO CDMA ranging code (step S106).

The MS selects one Target Base Station (TBS) based on the HO information included in the BSHO-RSP message received through coordination with the SBS. The MS may then transmit a ranging request message including a dedicated HO CDMA ranging code to the TBS (step S107).

The TBS receiving the CDMA code may inform the MS of success or failure of ranging and physical correction values through a ranging response (RNG-RSP) message (step S108).

If there is no need to correct the physical values in the MS, the MS transmits a ranging request (RNG-REQ) message for authentication, including a Medium Access Control (MAC) address thereof, to the TBS (step S109).

The TBS receiving the RNG-REQ message transmits System Information (SI), which is to be used therein, such as a Connection Identifier (CID) to the MS (step S110).

If the TBS successfully completes authentication of the MS and transmits all update information, the TBS may inform the SBS of success or failure of HO (step S111).

Next, the MS may perform communication with the TBS to which handoff is performed (step S120).

Figure 2:
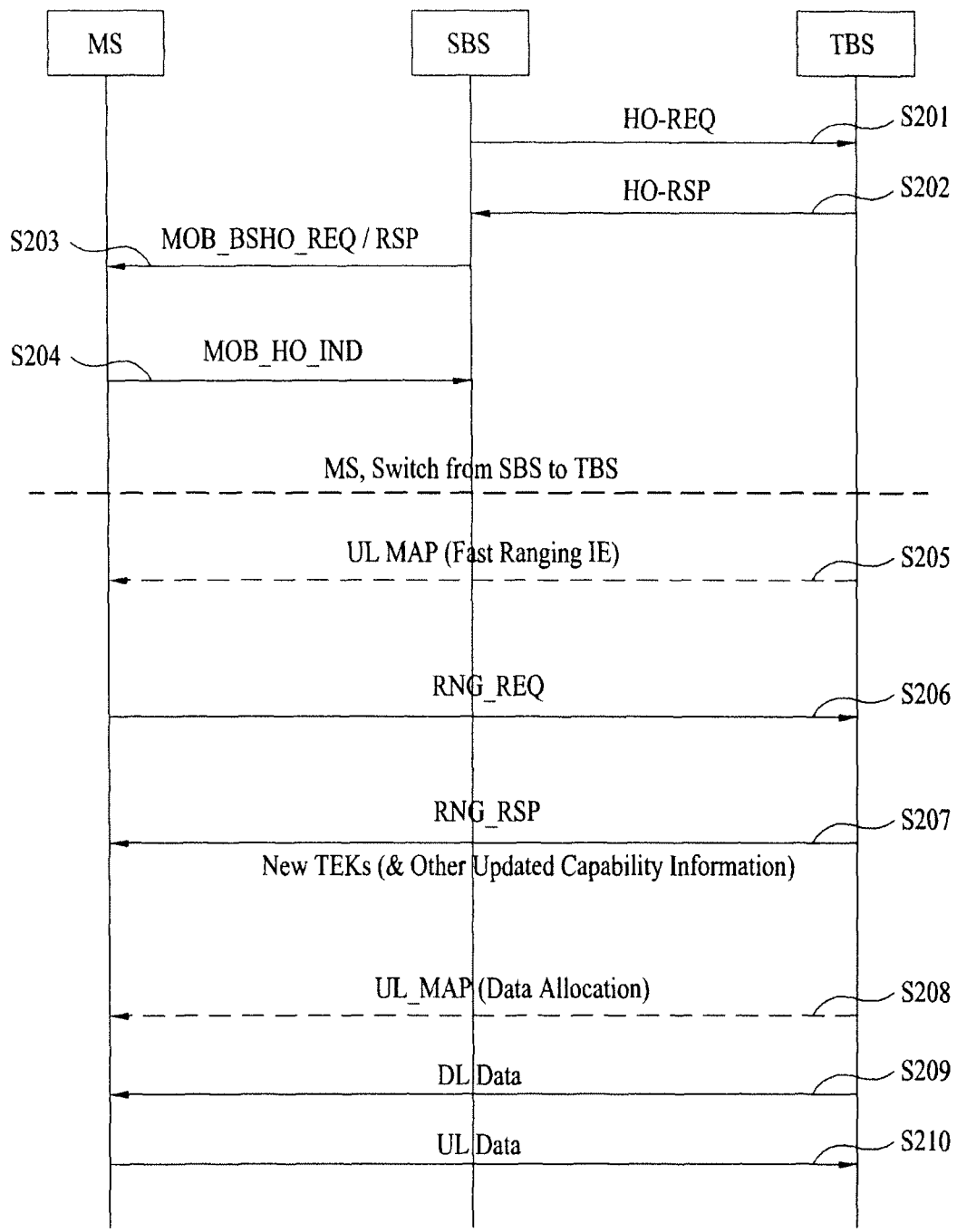
FIG. 2 is a diagram illustrating a method in which an MS updates new key information from a target BS during handover.

FIG. 2 is a diagram illustrating a method in which an MS updates new key information from a TBS during HO.

In FIG. 2, a method is shown in which an SBS request an MS to perform HO. The SBS transmits an HO request (HO-REQ) message to a TBS (step S201).

The TBS then transmits an HO response (HO-RSP) message including HO related information to the SBS (step S202).

The SBS transmits an HO request (MOB_BSHO_REQ) message to the MS and then may receive an HO response (MOB_BSHO_RSP) message as a response to the MOB_BSHO_REQ message (step S203).

If an HO execution condition is satisfied, the MS may transmit an HO indication (MOB_HO_IND) message to the SBS to inform the SBS that HO is performed (step S204).

The TBS may transmit an uplink (UL) MAP including a fast ranging Information Element (IE) for initial ranging to the MS (step S205).

The MS may transmit a ranging request (RNG-REQ) message to the TBS through UL resources using the fast ranging IE (step S206).

The TBS may transmit a ranging response (RNG-RSP) message, which includes ranging related information, new TEKs used in the TBS, and other updated capability information, to the MS (step S207).

The TBS may allocate UL resources for receiving data to the MS by transmitting a UL MAP message including scheduling information of UL resources to the MS (step S208).

The TBS encrypts downlink (DL) data using the TEKs transmitted in step S207 to the MS and may transmit the encrypted DL data to the MS (step S209).

The MS encrypts UL data using the TEKs received in step S207 and may transmit the encrypted UL data to the TBS (step S210).

Referring to FIG. 1 and FIG. 2, the MS may update the TEKs after receiving the RNG-RSP message from the TBS during HO. Accordingly, since the MS cannot process the encrypted data until receiving the RNG-RSP message after HO is completed, a data delay and an overhead problem may occur.

For example, during HO, the MS cannot restore the encrypted data until the MS receives the RNG-RSP message from the TBS and can restore the data only after obtaining the updated TEKs included in the RNG-RSP message. Therefore, much delay may occur in providing a real-time service.

Further, Radio Frequency (RF) circumstances are not good during HO. In these circumstances, update of a 128-bit TEK may generate a waste of an Over-The-Air (OTA) resource and may function as system overhead.

Hereinafter, HO to a BS supporting an evolved system from a BS supporting a legacy system will be described in detail.

FIG. 3 is diagrams illustrating methods for exchanging security capabilities and general capabilities between an MS and a TBS in an HO process according to an embodiment of the present invention.

In FIG. 3(a), the MS and the TBS first exchange security capabilities for TEK setting, set TEKs, and then exchange general capability information. In FIG. 3(b), the MS and the TBS first exchange security capabilities for TEK setting, exchange general capabilities, and then set TEKs.

The following Table 1 shows an example of a capability list of an IEEE 802.16e network, which can be reused in an IEEE 802.16m network.

TABLE 1

| Title | Contents |
| --- | --- |
| 16e capability list that can be reused in 16m | NSP list<br>Capabilities for construction and transmission of MAC PDU's<br>Security negotiation parameters<br>Visited NSP ID-Auth. Type of EAP<br>MIH capability supported-SDU MTU capability<br>Bandwidth allocation support<br>HO trigger<br>Association type support<br>Service information query (SIQ) capability<br>Visited NSP Realm<br>SII-ADV Message pointer-Extended capability<br>Supported physical parameters |

The following Table 2 shows an example of a supported physical parameter field out of the capability list of the IEEE 802.16e network, which can be reused in the IEEE 802.16m.

TABLE 2

| Title | Contents |
| --- | --- |
| Supported physical parameters | Subscriber transition gaps<br>Maximum Tx power (supported by SS)<br>Current Tx power-De/modulator types<br>DL/UL FEC types<br>UL power control support-Permutation support<br>AAS private MAP support (?)<br>CINR measurement capability<br>MAP capability<br>MIMO support<br>Pilot capability<br>HARQ incremental redundancy buffer capability<br>HARQ chase combining capability-OFDMA parameters set |

The following Table 3 shows an example of a new capability list format considered in the IEEE 802.16m network.

TABLE 3

| Title | Contents | Size |
| --- | --- | --- |
| Multi-Carrier Configuration | Carrier aggregation<br>Carrier decoding capability<br>Frame structure-MPDU processing | |
| E-MBS | PHY capability<br>SON capability | |
| Security | | |
| Legacy Support Frame Configuration | | |

Referring to FIG. 3(a), an AMS may receive a neighbor BS advertisement (MOB_NBR-ADV) message including system information (SI) about neighbor BSs from a YBS of an IEEE 802.16e network, which is an SBS (step S301).

As communication environments vary, the AMS may determine HO to a TBS (e.g. ABS) which is one of neighbor BSs. It is assumed that the TBS is an ABS of an IEEE 802.16m network. In this case, the AMS should newly negotiate with the ABS about capabilities of the IEEE 802.16m network.

Accordingly, the AMS performs a procedure for exchanging security capabilities with the ABS. The contents of the security capabilities may be security negotiation parameter and an EAP authentication type field of Table 1 and a security capability field of Table 3 (step S330).

The AMS and the ABS may generate TEKs using the security capabilities exchanged in step S330 (steps S350a and S350b).

The AMS and the ABS may perform a negotiation process for general capabilities in addition to the previously negotiated security capabilities. At the time, the AMS and the ABS may maintain confidentiality of the general capability negotiating process using the TEKs generated in step S305 (step S370).

FIG. 3(b) is very similar to FIG. 3(a). Steps S320 and S340 are the same as steps S310 and S330. However, in FIG. 3(b), TEK generation processes (steps S308a and S380b) are performed after a general capability exchange process (step S360).

Figure 4:
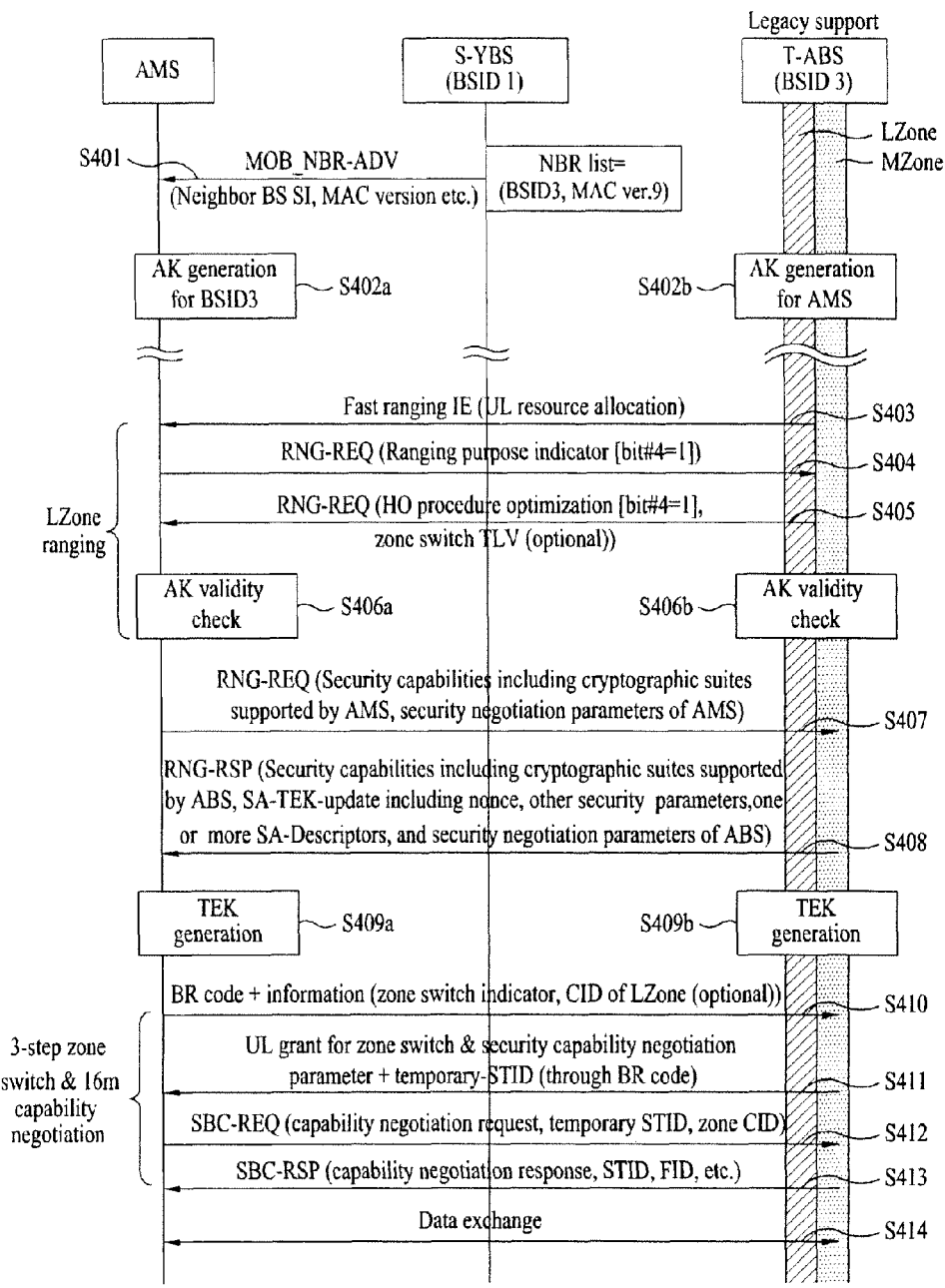
FIG. 4 is a diagram illustrating one pre-security capability negotiation method according to an embodiment of the present invention.

FIG. 4 is a diagram illustrating one pre-security capability negotiation method according to an embodiment of the present invention In FIG. 4, an AMS is a user equipment supporting an IEEE 802.16m system and is within a zone of a YBS which is an IEEE 802.16e BS. It is assumed in FIG. 4 that the AMS performs HO to a Target ABS (T-ABS) which is an IEEE 802.16m BS. It is also assumed that the T-ABS includes an LZone for supporting an IEEE 802.16e system as a legacy system and includes an MZone for supporting an IEEE 802.16m system.

FIG. 4 shows a pre-security capability negotiation and TEK setting process for performing a 3-step zone switch and capability negotiation process. More specifically, in FIG. 4, the AMS and the MZone of the T-ABS share security capabilities through exchange of ranging message (RNG-REQ/RNG-RSP), set TEKs, and perform 3-step zone switch and capability negotiation.

While an AMS served by an YBS performs Ho to an ABS, the AMS should newly negotiate with the ABS about capabilities of the IEEE 802.16m system. In this case, an authentication procedure or a registration procedure in the ABS may be omitted as in general HO case.

Referring to FIG. 4, a Serving YBS (S-YBS) may periodically broadcast a neighbor BS advertisement (MOB_NBR-ADV) message which includes neighbor BS SI and MAC version information (step S401).

In step S401, the neighbor BS SI may include a neighbor BS list. The neighbor BS list may include ID information of the T-ABS, (e.g. BSID 3), and MAC version information of the T-ABS, (e.g. MAC ver. 9).

The AMS and the T-ABS may generate Authentication Keys (AKs) using information (T-ABS ID (BSID 3), etc.) obtained in step S401 (steps S402a and S402b).

The AMS performing HO from the YBS to the T-ABS may perform a ranging procedure for HO in an LZone of the T-ABS. In this case, the AMS may receive fast ranging IE including UL allocation information from the LZone of the T-ABS (step S403).

The AMS may transmit a ranging request (RNG-REQ) message including a ranging purpose indicator to the LZone of the T-ABS through the UL resource area allocated in step S403. The ranging purpose indicator (e.g. bits #0 to #4) is set to '1', this may indicate that the AMS performs HO or network re-entry (step S404).

Upon receiving the RNG-REQ message, the T-ABS may transmit a ranging response (RNG-RSP) message including HO process optimization information to the AMS through the LZone. The RNG-RSP message may further include a zone switch TLV field (step S405).

In step S405, the T-ABS may perform an operation with the AMS, which has been performed in the LZone, in an MZone according to indication of a zone switch TLV.

The AMS and the T-ABS checks the validity of the AKs. If the AKs need to be updated, the AMS and the T-ABS may update the AKs using security related information belonging thereto (steps S406a and S406b).

After completing a ranging procedure in the LZone, the AMS and the T-ABS may switch a zone from the LZone to the MZone. Accordingly, procedures after step S406 may desirably be performed in the MZone of the T-ABS.

The AMS may transmit an RNG-REQ message, which contains security capabilities including cryptographic suites supported thereby and contains security negotiation parameters thereof, to the MZone of the T-ABS (step S407).

The T-ABS may transmit an RNG-RSP message as a response to the received RNG-REQ message to the AMS. The RNG-RSP message may include at least one of security capabilities including cryptographic suites supported by the T-ABS, Security Association TEK update (SA-TEK-update) TLV including nonce, other security parameters, one or more Security Association Descriptors (SA-Descriptors), and security negotiation parameters of the ABS. The security capabilities or security related parameters may refer to the description of Table 1 to Table 3 (step S408).

The AMS and the T-ABS may generate the same TEK using the AKs generated in step S402 and the security parameters (e.g. nonce, key counter, Security Association ID (SAID), etc.) exchanged in the ranging procedures (steps S407 and S408). The AMS and the T-ABS may generate the same TEK with respect to data and signaling and may generate different TEKs (steps S409a and S409b).

The following Equation 1 indicates one method for generating a TEK in the embodiments of the present invention.

$$(Old,New)TEK=Dot16KDF(AK,(Old,New)Nonce|TEK\ Counter|SAID|"TEK",128) \quad \text{[Equation 1]}$$

Referring to Equation 1, the AMS and the T-ABS may generate TEKs using AKs and security parameters (e.g. nonce, TEK counter, and SAID).

The AMS may transmit a Bandwidth Request (BR) code indicating that zone switch is performed to the MZone of the T-ABS. In this case, the AMS may inform the T-ABS of a BR code transmission reason or additional information and a zone switch indicator indicating whether an attempt to perform zone switch is made. The AMS may selectively transmit a CID which is used in the LZone (step S410).

The AMS may transmit the CID to the T-ABS in step S412 instead of in step S410.

Upon receiving the BR code indicating that zone switch is performed, the T-ABS may transmit a UL grant including UL resource information for transmitting an SBC-REQ message to the AMS. The T-ABS may transmit a Temporary Station Identifier (STID) allocated to the AMS and the BR code transmitted by the AMS to the AMS together with the UL grant (step S411).

The AMS to which UL resources have been allocated may transmit an SBC-REQ message, including a temporary STID and a capability request of the ABS, to the MZone of the T-ABS (step S412).

In step S412, the AMS may additionally include a CID used in the AMS or the LZone and/or a flow ID (FID) for identifying services in the SBC-REQ message transmitted in step S412. In other words, the AMS may assure the T-ABS of identity thereof in the MZone. Through this process, the AMS enables the T-ABS to facilitate a task for newly mapping a connection or flow made with the AMS in the LZone to an STID or an FID.

The ABS may generate an STID, which is to be fixedly used, using at least one of the temporary STID, CID, and FID transmitted by the AMS. The T-ABS may perform mapping of an STID and an FID of the AMS and then transmit an SBC-RSP message including the STID to the AMS (step S413).

In steps S412 and S413, the AMS and the T-ABS may transmit an encrypted SBC-REQ message and an encrypted SBC-RSP message using the TEKs generated in steps S409a and S409b, respectively. Accordingly, confidentiality of the SBC-REQ message and the SBC-RSP message can be protected even before the AMS is fully registered in the T-ABS.

If capability negotiation between the AMS and the ABS has been successfully completed through the above-described processes, the AMS and the ABS may restart communication which has been performed in the LZone (step S414).

In the process of exchanging data in step S414, data may be encrypted using the TEKs generated in steps S409a and S409b, thereby protecting data confidentiality.

Figure 5:
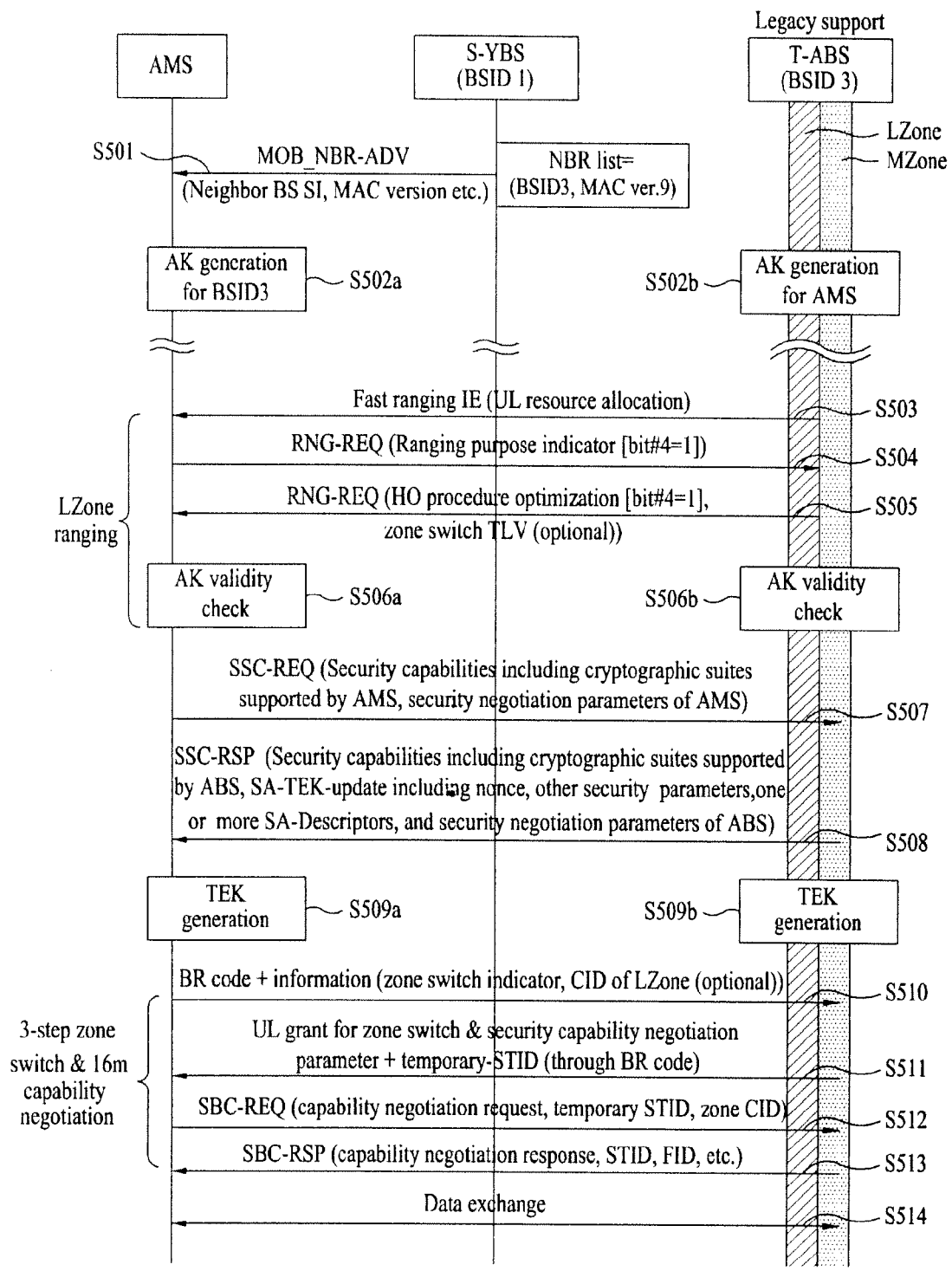
FIG. 5 is a diagram illustrating another pre-security capability negotiation method according to an embodiment of the present invention.

FIG. 5 is a diagram illustrating another pre-security capability negotiation method according to an embodiment of the present invention.

A description of FIG. 5 is very similar to a description of FIG. 4. However, in FIG. 5, messages which are newly defined in the present invention are used instead of the ranging messages used in steps S407 and S408. Steps which are not described in conjunction with FIG. 5 may refer to steps of FIG. 4.

In FIG. 5, the AMS and the MZone of the T-ABS share security capabilities through exchange of an SSC-REQ message and an SSC-RSP message, set TEKs, and perform 3-step zone switch and capability negotiation.

Referring to FIG. 5, the AMS may transmit an AMS Security Capability Request (SSC-REQ) message which contains security capabilities including cryptographic suites supported thereby and contains security negotiation parameters thereof to the MZone of the T-ABS (step S507).

The T-ABS may transmit an AMS Security Capability Response (SSC-RSP) message as a response to the received SSC-REQ message to the AMS. The SSC-RSP message may include at least one of security capabilities including cryptographic suites supported by the ABS, SA-TEK-update TLV including nonce, other security parameters, one or more SA-Descriptors, and security negotiation parameters of the ABS (step S508).

In FIG. 5, the SSC-REQ message and the SSC-RSP message may be used instead of the SBC-REQ message and the SBC-RSP message of the IEEE 802.16e system.

Figure 6:
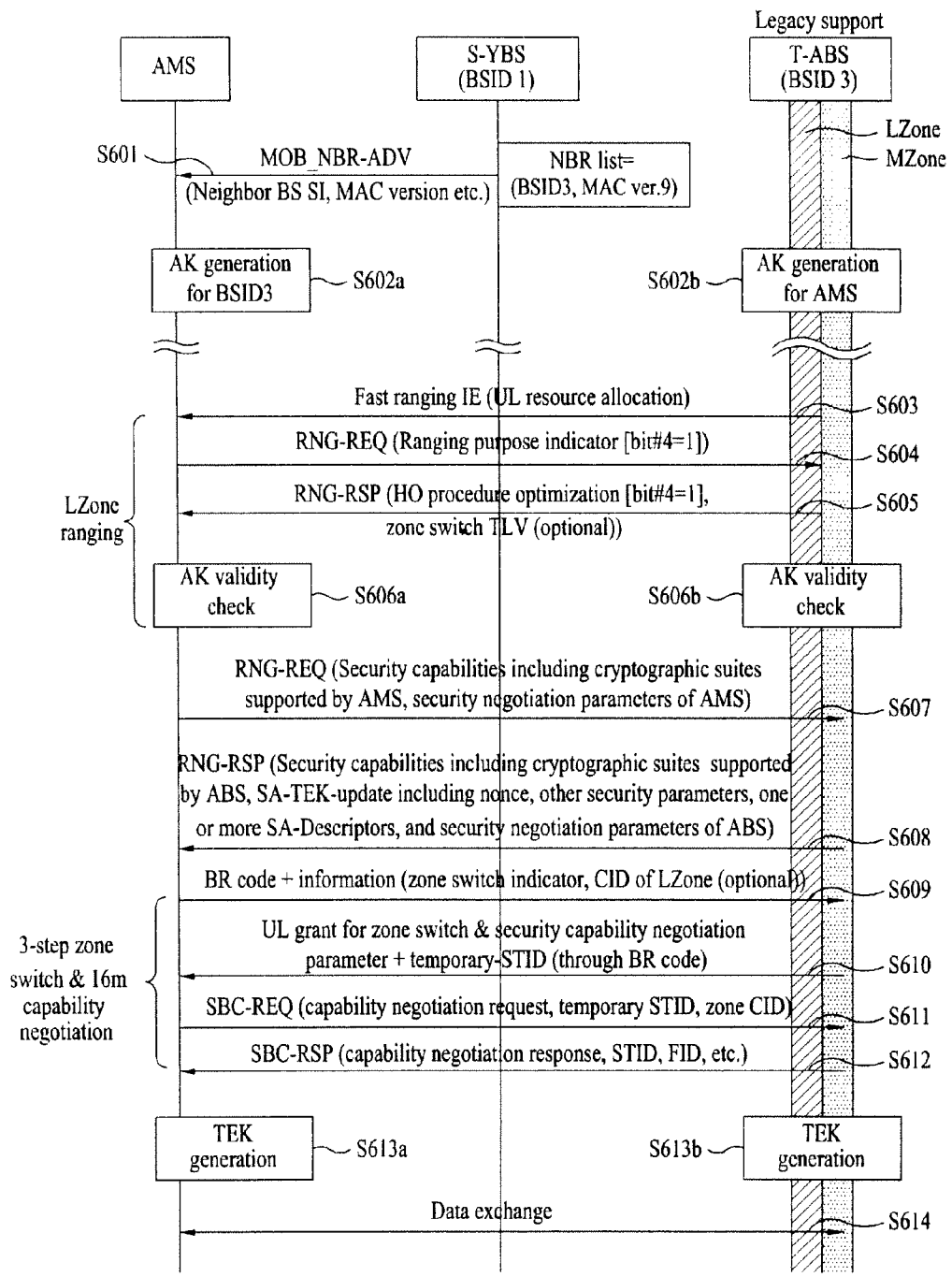
FIG. 6 is a diagram illustrating still another pre-security capability negotiation method according to an embodiment of the present invention.

FIG. 6 is a diagram illustrating still another pre-security capability negotiation method according to an embodiment of the present invention.

FIG. 6 shows a pre-security capability negotiation process for performing a 3-step zone switch and capability negotiation process. More specifically, in FIG. 3, the AMS and the MZone of the T-ABS share security capabilities through exchange of ranging messages (RNG-REQ/RNG-RSP), perform 3-step zone switch and capability negotiation, and then generate TEKs prior to data exchange.

Steps S601 to S606 are the same as steps S401 to S405 of FIG. 4, and therefore, a description thereof may refer to FIG. 4. Hereinafter, steps which are different from steps of FIG. 4 will be described.

The AMS and the T-ABS which have completed a ranging procedure in the LZone may perform zone switch to an MZone from the LZone. Accordingly, procedures after step S406 are desirably performed in the MZone of the ABS.

The AMS may transmit an RNG-REQ message which contains security capabilities including cryptographic suites supported thereby and contains security negotiation parameters thereof to the MZone of the T-ABS (step S607).

The T-ABS may transmit an RNG-RSP message as a response to the received RNG-REQ message to the AMS. The RNG-RSP message may include at least one of security capabilities including cryptographic suites supported by the T-ABS, SA-TEK-update TLV including nonce, other security parameters, one or more SA-Descriptors, and security negotiation parameters of the ABS (step S608).

The AMS may transmit a BR code indicating that zone switch is performed to the MZone of the T-ABS. In this case, the AMS may inform the T-ABS of a BR code transmission reason or additional information and a zone switch indicator indicating whether an attempt to perform zone switch is made. The AMS may selectively transmit a CID which is used in the LZone to the T-ABS (step S609).

The AMS may transmit the CID to the T-ABS in step S611 which will be described hereinbelow, instead of in step S609.

Upon receiving the BR code indicating that zone switch is to be performed, the T-ABS may transmit a UL grant including UL resource information for transmitting an SBC-REQ message to the AMS. The T-ABS may transmit a temporary STID allocated to the AMS and the BR code transmitted by the AMS to the AMS together with the UL grant (step S610).

The AMS to which UL resources have been allocated may transmit an SBC-REQ message, including a temporary STID and a capability request of the ABS, to the MZone of the T-ABS (step S611).

In step S611, the AMS may additionally include a CID used in the AMS or the LZone and/or an FID for identifying services in the SBC-REQ message transmitted in step S611. In other words, the AMS may assure the T-ABS of identity thereof in the MZone. Through this process, the AMS enables the T-ABS to facilitate a task for newly mapping a connection or flow made with the AMS in the LZone to an STID or an FID.

The ABS may generate an STID, which is to be fixedly used, using at least one of the temporary STID, CID, and FID transmitted by the AMS. The T-ABS may perform mapping of an STID and an FID of the AMS and then transmit an SBC-RSP message including the STID to the AMS (step S612).

The AMS and the T-ABS may generate the same TEK using the AKs generated in step S602 and the security parameters exchanged in the ranging procedures (step S607 and S608). The AMS and the T-ABS may generate the same TEK with respect to data and signaling or may generate different TEKs (steps S613a and S613b).

If capability negotiation between the AMS and the T-ABS has been successfully completed through the above-described processes, the AMS and the T-ABS may restart communication which has been performed in the LZone (step S614).

In the process of exchanging data in step S614, the AMS and the T-ABS may encrypt data using the TEKs generated in steps S613a and S613b, thereby protecting data confidentiality.

Figure 7:
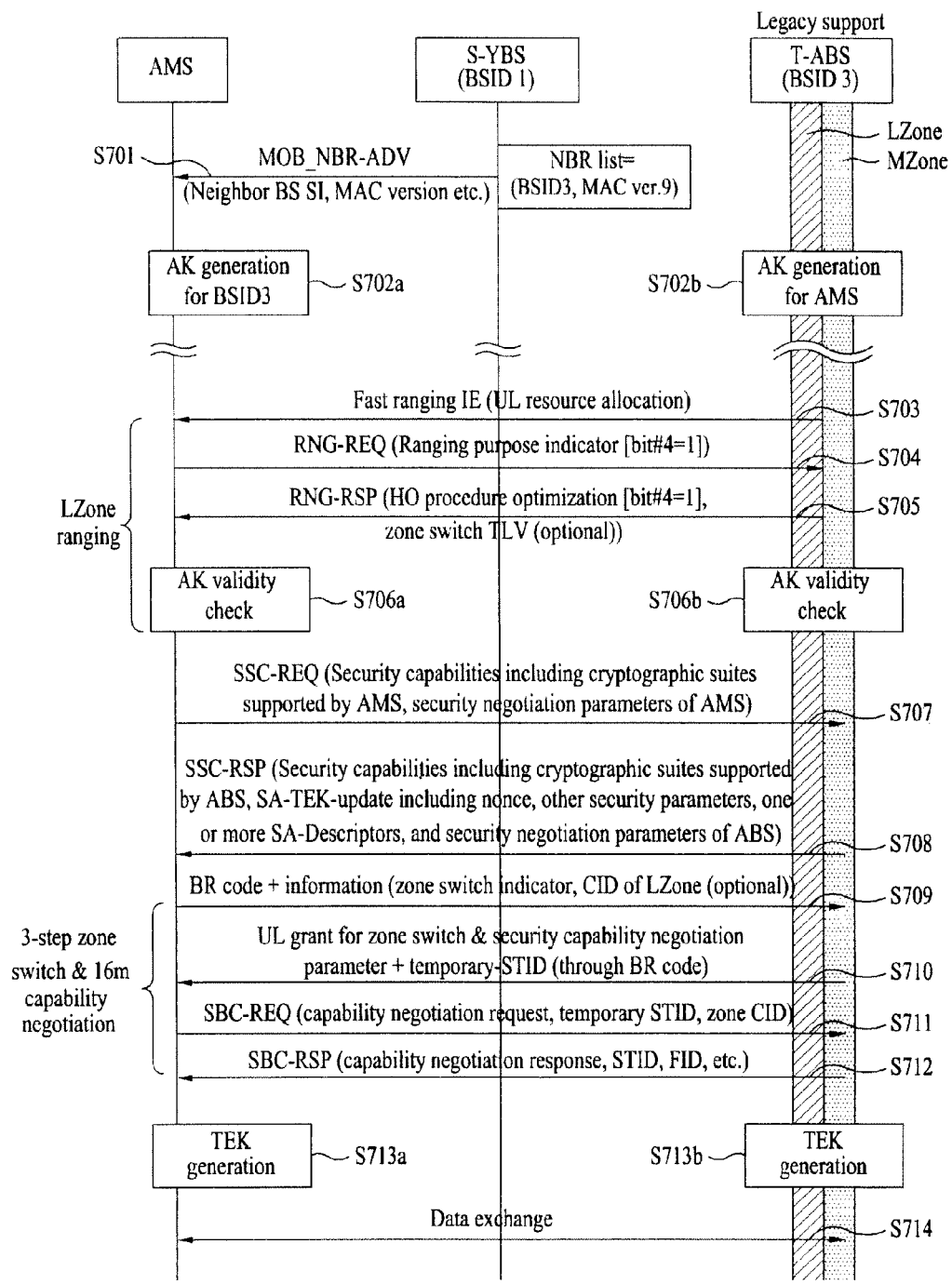
FIG. 7 is a diagram illustrating still another pre-security capability negotiation method according to an embodiment of the present invention.

FIG. 7 is a diagram illustrating still another pre-security capability negotiation method according to an embodiment of the present invention.

A description of FIG. 7 is very similar to a description of FIG. 6. However, in FIG. 7, newly defined messages in the present invention are used in steps S707 and S708 instead of the ranging messages. Steps which are not described in conjunction with FIG. 7 may refer to steps of FIG. 6.

In FIG. 7, the AMS and the MZone of the T-ABS share security capabilities through exchange of an SSC-REQ message and an SSC-RSP message, set TEKs, and perform 3-step zone switch and capability negotiation.

Referring to FIG. 7, the AMS may transmit an SSC-REQ message which contains security capabilities including cryptographic suites supported thereby and contains security negotiation parameters thereof to the MZone of the T-ABS (step S707).

The T-ABS may transmit an SSC-RSP message as a response to the received SSC-REQ message to the AMS. The SSC-RSP message may include at least one of security capabilities including cryptographic suites supported by the T-ABS, SA-TEK-update TLV including nonce, other security parameters, one or more SA-Descriptors, and security negotiation parameters of the ABS (step S708).

In FIG. 7, the SSC-REQ message and the SSC-RSP message may be used instead of the SBC-REQ message and the SBC-RSP message of the IEEE 802.16e system, respectively. The confidentiality of data exchanged between the AMS and the T-ABS can be protected by the TEKs generated in steps S731a and S713b.

Figure 8:
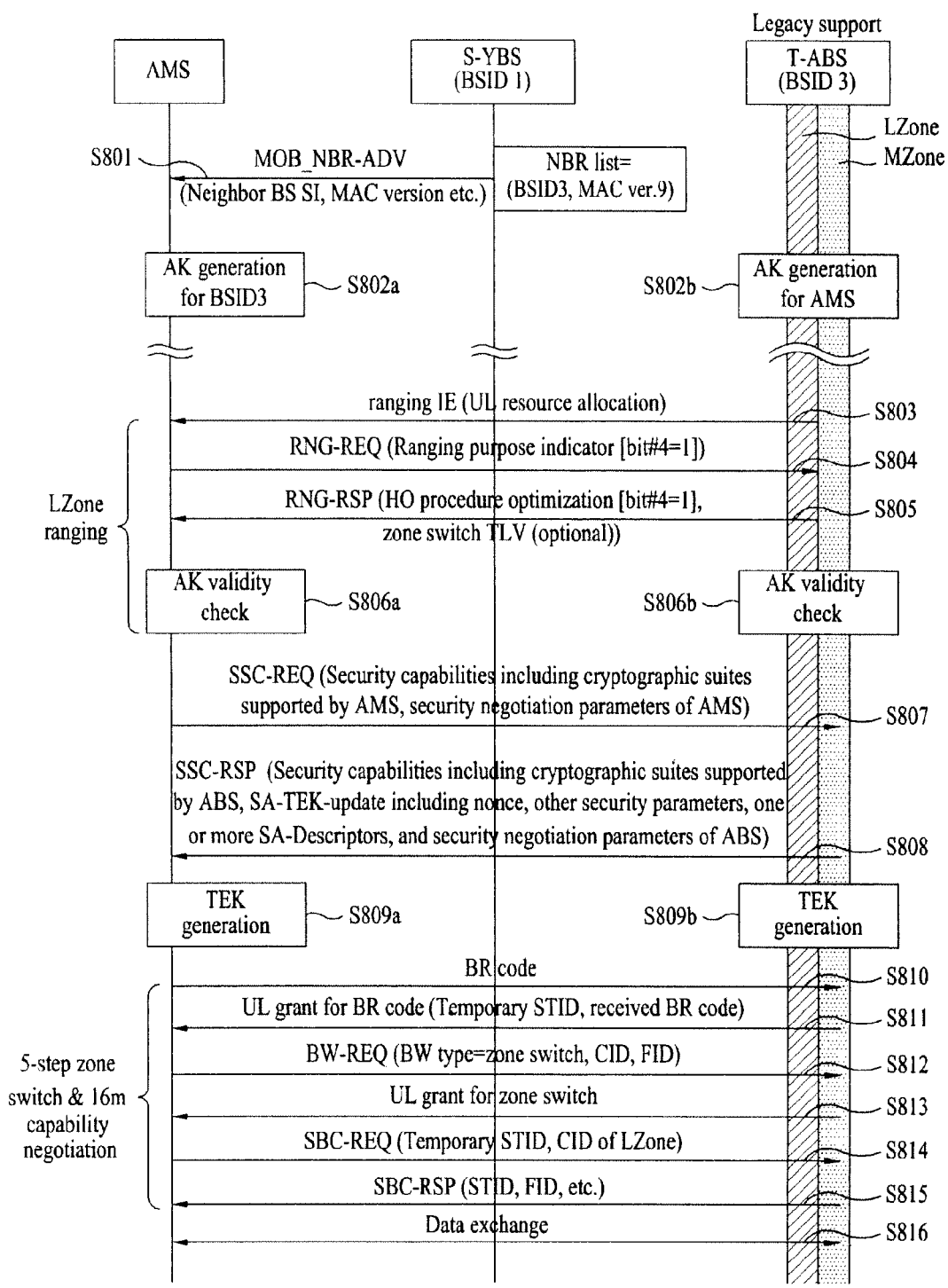
FIG. 8 is a diagram illustrating one pre-security capability negotiation method according to another embodiment of the present invention.

FIG. 8 is a diagram illustrating one pre-security capability negotiation method according to another embodiment of the present invention.

FIG. 8 shows a pre-security capability negotiation process for performing a 5-step zone switch and capability negotiation process. More specifically, in FIG. 8, the AMS and the MZone of the T-ABS share security capabilities through exchange of ranging messages (RNG-REQ/RNG-RSP), set respective TEKs, and then perform 5-step zone switch and capability negotiation.

Steps S801 to S806 of FIG. 8 are the same as steps S401 to S406 of FIG. 4. Also, steps S807 to S809 of sharing security capabilities through ranging procedures in the AMS and the MZone of the T-ABS and generating respective TEKs are also the same as steps S407 to S409 of FIG. 4. However, a zone switch and capability negotiation process is different from that in FIG. 4.

Referring to FIG. 8, the AMS may perform network entry to the MZone and then transmit a BR code for the MZone of the T-ABS to the T-ABS (step S810).

The T-ABS which has received the contention-based BR code may transmit a UL grant for allocating UL resources for a BR to the AMS. The T-ABS may allocate a temporary STID to the AMS to transmit the temporary STID and the UL grant to the AMS (step S811).

The AMS to which the UL resources have been allocated may transmit a Bandwidth Request (BW-REQ) message for performing a capability negotiation process to the T-ABS. In this case, the BW-REQ message may include a bandwidth request reason, that is, a zone switch indicator. The AMS may further include information such as a CID thereof and an FID in the BW-REQ message in order to assure the T-ABS of identity thereof in the LZone (step S812).

Upon receiving the BW-REQ message, the T-ABS allocates UL resources for transmission of an SBC-REQ message to the AMS and transmits a UL grant including information about the UL resources to the AMS (step S813).

Upon receiving the UL grant, the AMS may transmit the SBC-REQ message including one or more of a temporary STID thereof and a capability request of the T-ABS to the T-ABS through the allocated UL resource area (step S814).

In step 814, the AMS may additionally include a CID used in the T-AMS or in the LZone and/or an FID for identifying services in the transmitted SBC-REQ message.

Namely, the AMS may assure the T-ABS of identity thereof in the MZone. Through this process, the AMS enables the T-ABS to facilitate a task for newly mapping a connection or flow made with the AMS in the LZone to an STID or an FID.

The T-ABS may generate an STID, which is to be fixedly used, using at least one of the temporary STID, CID, and FID transmitted by the AMS. The T-ABS may perform mapping of an STID and an FID of the AMS and then transmit an SBC-RSP message including the STID to the AMS (step S815).

In steps S814 and S815, the AMS and the T-ABS may transmit an encrypted SBC-REQ message and an encrypted SBC-RSP message using the TEKs generated in steps S809a and S809b, respectively. Accordingly, confidentiality of the SBC-REQ message and the SBC-RSP message can be protected even before the AMS is fully registered in the T-ABS.

If capability negotiation between the AMS and the ABS has been successfully completed through the above-described processes, the AMS and the T-ABS may restart communication which has been performed in the LZone (step S816).

In the process of exchanging data in step S816, the data may be encrypted using the TEKs generated in steps S809a and S809b, thereby protecting data confidentiality.

Figure 9:
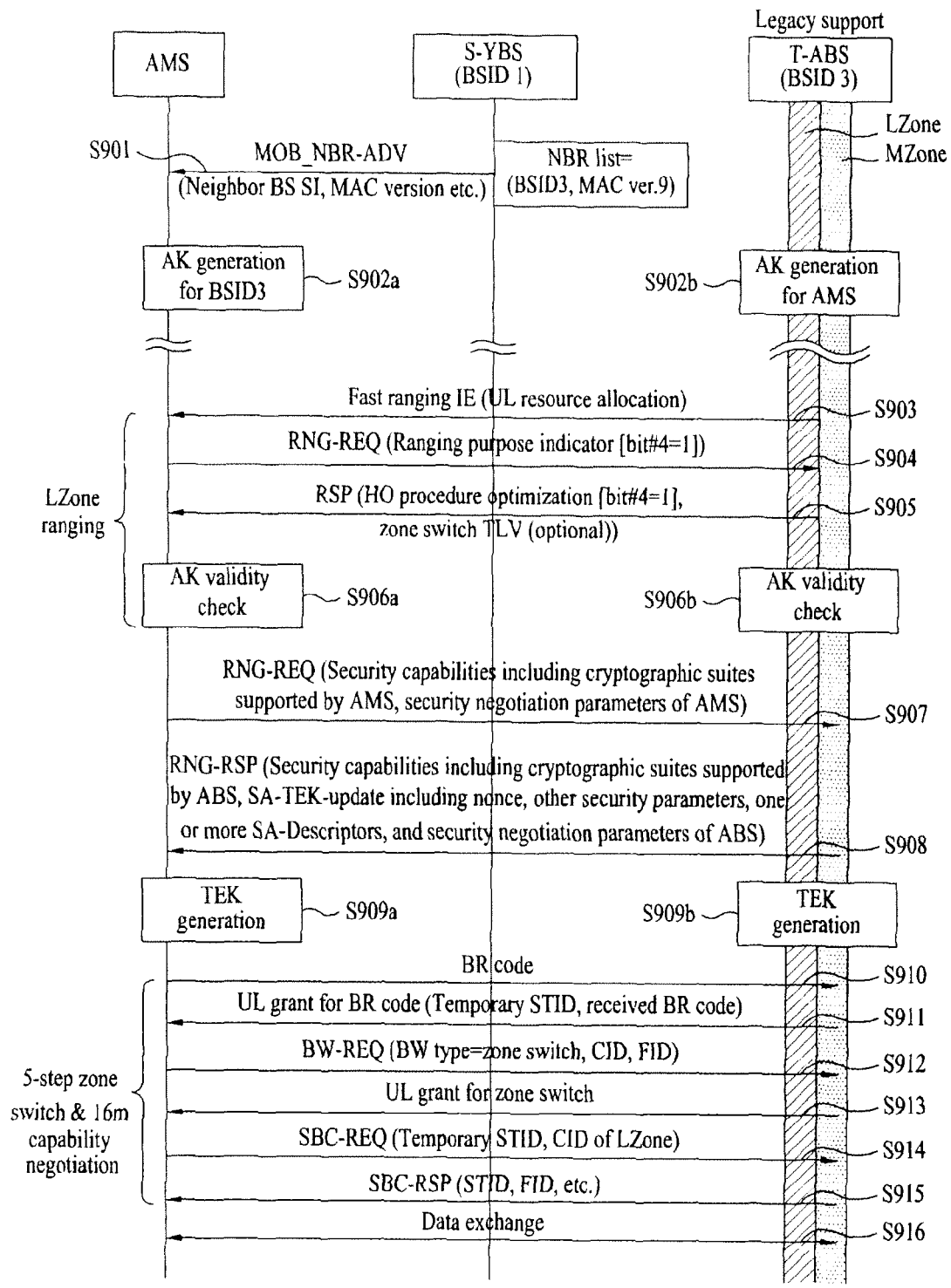
FIG. 9 is a diagram illustrating another pre-security capability negotiation method according to another embodiment of the present invention.

FIG. 9 is a diagram illustrating another pre-security capability negotiation method according to another embodiment of the present invention.

A description of FIG. 9 is very similar to a description of FIG. 8. However, in FIG. 9, newly defined messages in the present invention are used in steps S907 and S908 instead of the ranging messages. Steps which are not described in conjunction with FIG. 9 may refer to steps of FIG. 8.

In FIG. 9, the AMS and the MZone of the T-ABS share security capabilities through exchange of an SSC-REQ message and an SSC-RSP message, set TEKs, and perform 5-step zone switch and capability negotiation.

Referring to FIG. 9, the AMS may transmit an SSC-REQ message which contains security capabilities including cryptographic suites supported thereby and contains security negotiation parameters thereof to the MZone of the T-ABS (step S907).

The T-ABS may transmit an SSC-RSP message as a response to the received SSC-REQ message to the AMS. The SSC-RSP message may include at least one of security capabilities including cryptographic suites supported by the ABS, SA-TEK-update TLV including nonce, other security parameters, one or more SA-Descriptors, and security negotiation parameters of the ABS (step S908).

In FIG. 9, the SSC-REQ message and the SSC-RSP message may be used instead of the SBC-REQ message and the SBC-RSP message of the IEEE 802.16e system, respectively. The confidentiality of data exchanged between the AMS and the T-ABS can be protected by the TEKs generated in steps S909a and S909b.

Figure 10:
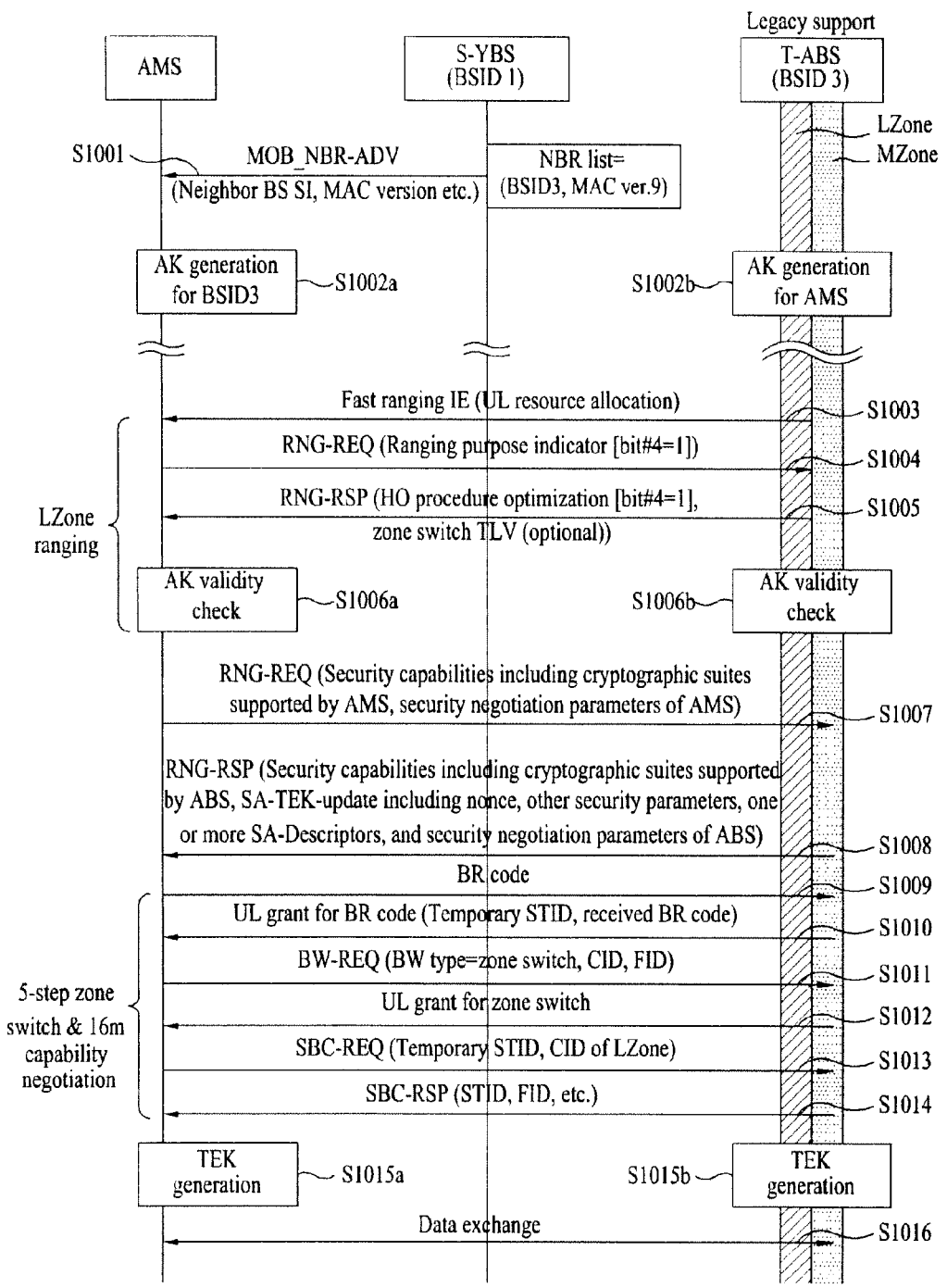
FIG. 10 is a diagram illustrating still another pre-security capability negotiation method according to another embodiment of the present invention.

FIG. 10 is a diagram illustrating still another pre-security capability negotiation method according to another embodiment of the present invention.

FIG. 10 shows a pre-security capability negotiation process for performing a 5-step zone switch and capability negotiation process. More specifically, in FIG. 10, the AMS and the MZone of the T-ABS share security capabilities through exchange of ranging messages (RNG-REQ/RNG-RSP), perform 5-step zone switch and capability negotiation, and then generate TEKs prior to data exchange.

Steps S1001 to S1006 are the same as steps S801 to S805 of FIG. 8, and therefore, a description thereof may refer to FIG. 8. Hereinafter, steps which are different from steps of FIG. 8 will be described.

The AMS and the T-ABS which have completed a ranging procedure in the LZone may perform zone switch to the MZone from the LZone. Accordingly, procedures after step S806 are desirably performed in the MZone of the ABS.

The AMS may transmit an RNG-REQ message which contains security capabilities including cryptographic suites supported thereby and contains security negotiation parameters thereof to the MZone of the T-ABS (step S1007).

The T-ABS may transmit an RNG-RSP message as a response to the received RNG-REQ message to the AMS. The RNG-RSP message may include at least one of security capabilities including cryptographic suites supported by the T-ABS, SA-TEK-update TLV including nonce, other security parameters, one or more SA-Descriptors, and security negotiation parameters of the ABS. (step S1008).

Referring to FIG. 10, the AMS may perform network entry to the MZone and then transmit a BR code for the MZone of the T-ABS to the T-ABS (step S1009).

The T-ABS which has received the contention-based BR code may transmit a UL grant for allocating UL resources for a bandwidth request to the AMS. The T-ABS may allocate a temporary STID to the AMS to transmit the temporary STID and the UL grant to the AMS (step S1010).

The AMS to which the UL resources have been allocated may transmit a Bandwidth Request (BW-REQ) message for performing a capability negotiation process to the T-ABS. In this case, the BW-REQ message may include a bandwidth request reason, that is, a zone switch indicator. The AMS may further include information such as a CID thereof and an FID in the BW-REQ message in order to assure the T-ABS of identity thereof in the LZone (step S1011).

Upon receiving the BW-REQ message, the T-ABS allocates UL resources for transmission of an SBC-REQ message to the AMS and transmits a UL grant including information about the UL resources to the AMS (step S1012).

Upon receiving the UL grant, the AMS may transmit the SBC-REQ message including one or more of a temporary STID thereof and a capability request of the T-ABS to the T-ABS through the allocated UL resource area (step S1013).

In step 1013, the AMS may additionally include a CID used in the T-AMS or in the LZone and/or an FID for identifying services in the transmitted SBC-REQ message. In other words, the AMS may assure the T-ABS of identity thereof in the MZone. Through this process, the AMS enables the T-ABS to facilitate a task for newly mapping a connection or flow made with the AMS in the LZone to an STID or an FID.

The T-ABS may generate an STID, which is to be fixedly used, using at least one of the temporary STID, CID, and FID transmitted by the AMS. The T-ABS may perform mapping of an STID and an FID of the AMS and then transmit an SBC-RSP message including the STID to the AMS (step S1014).

The AMS and the T-ABS may generate respective TEKs using parameters obtained in step S1002 and security capability negotiation (steps S1015a and S1015b).

If capability negotiation between the AMS and the T-ABS has been successfully completed through the above-described processes, the AMS and the T-ABS may restart communication which has been performed in the LZone (step S1016).

In the process of exchanging data in step S1016, data may be encrypted using the TEKs generated in steps S1015a and S1015b, thereby protecting data confidentiality.

Figure 11:
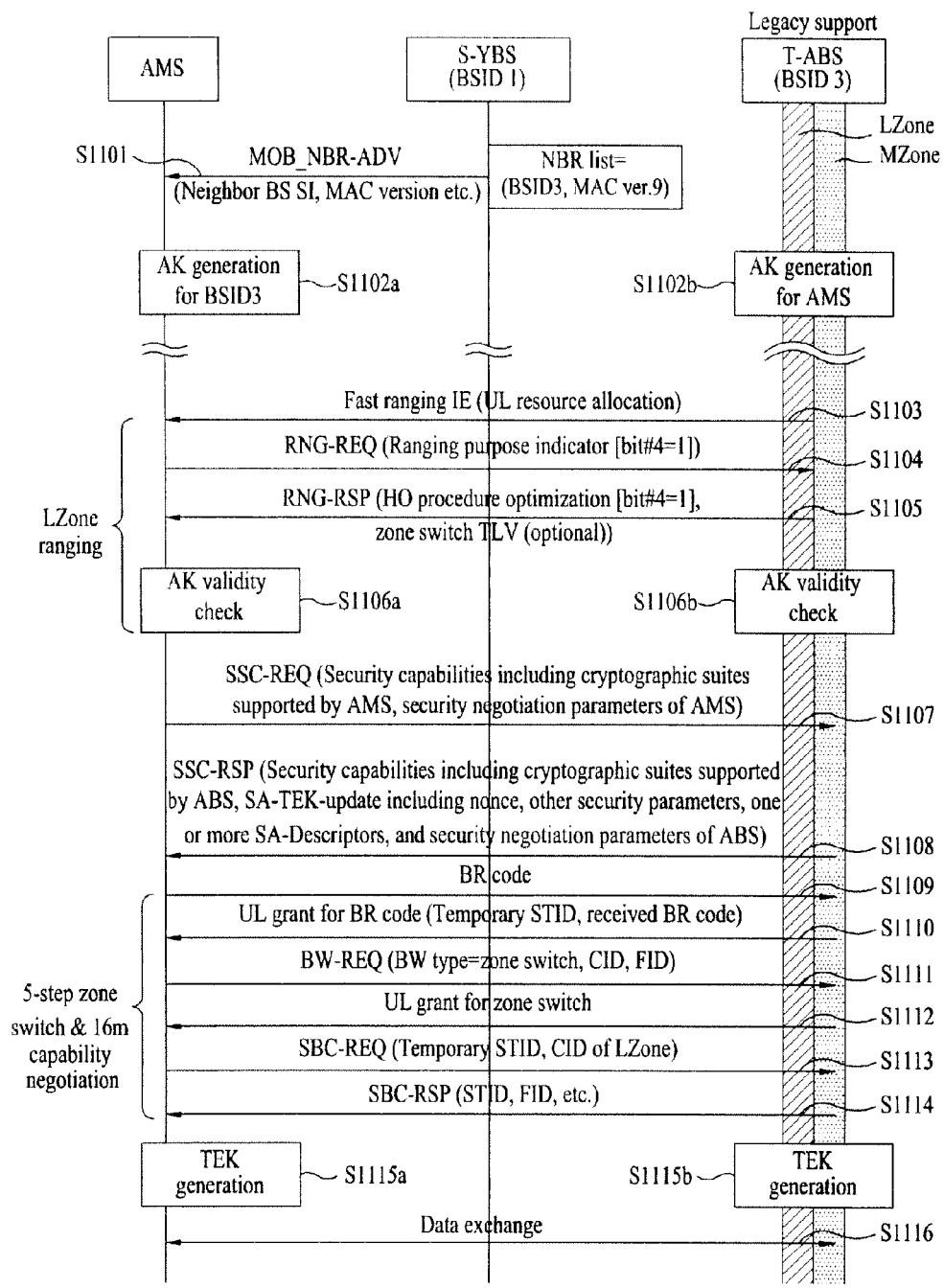
FIG. 11 is a diagram illustrating still another pre-security capability negotiation method according to another embodiment of the present invention.

FIG. 11 is a diagram illustrating still another pre-security capability negotiation method according to another embodiment of the present invention A description of FIG. 11 is very similar to a description of FIG. 10. However, in FIG. 11, messages which are newly defined in the present invention are used in steps S1107 and S1108 instead of the ranging messages. Steps which are not described in conjunction with FIG. 11 may refer to steps of FIG. 10.

In FIG. 11, the AMS and the Mzone of the T-ABS share security capabilities through exchange of an SSC-REQ message and an SSC-RSP message, set TEKs, and then perform 5-step zone switch and capability negotiation.

Referring to FIG. 11, the AMS may transmit an SSC-REQ message which contains security capabilities including cryptographic suites supported thereby and contains security negotiation parameters thereof to the MZone of the T-ABS (step S1107).

The T-ABS may transmit an SSC-RSP message as a response to the received SSC-REQ message to the AMS. The SSC-RSP message may include at least one of security capabilities including cryptographic suites supported by the ABS, SA-TEK-update TLV including nonce, other security parameters, one or more SA-Descriptors, and security negotiation parameters of the ABS (step S1108).

In FIG. 11, the SSC-REQ message and the SSC-RSP message may be used instead of the SBC-REQ message and the SBC-RSP message of an IEEE 802.16e system, respectively. The confidentiality of data exchanged between the AMS and the T-ABS in step S1116 can be protected by the TEKs generated in steps S1115a and S1115b.

Figure 12:
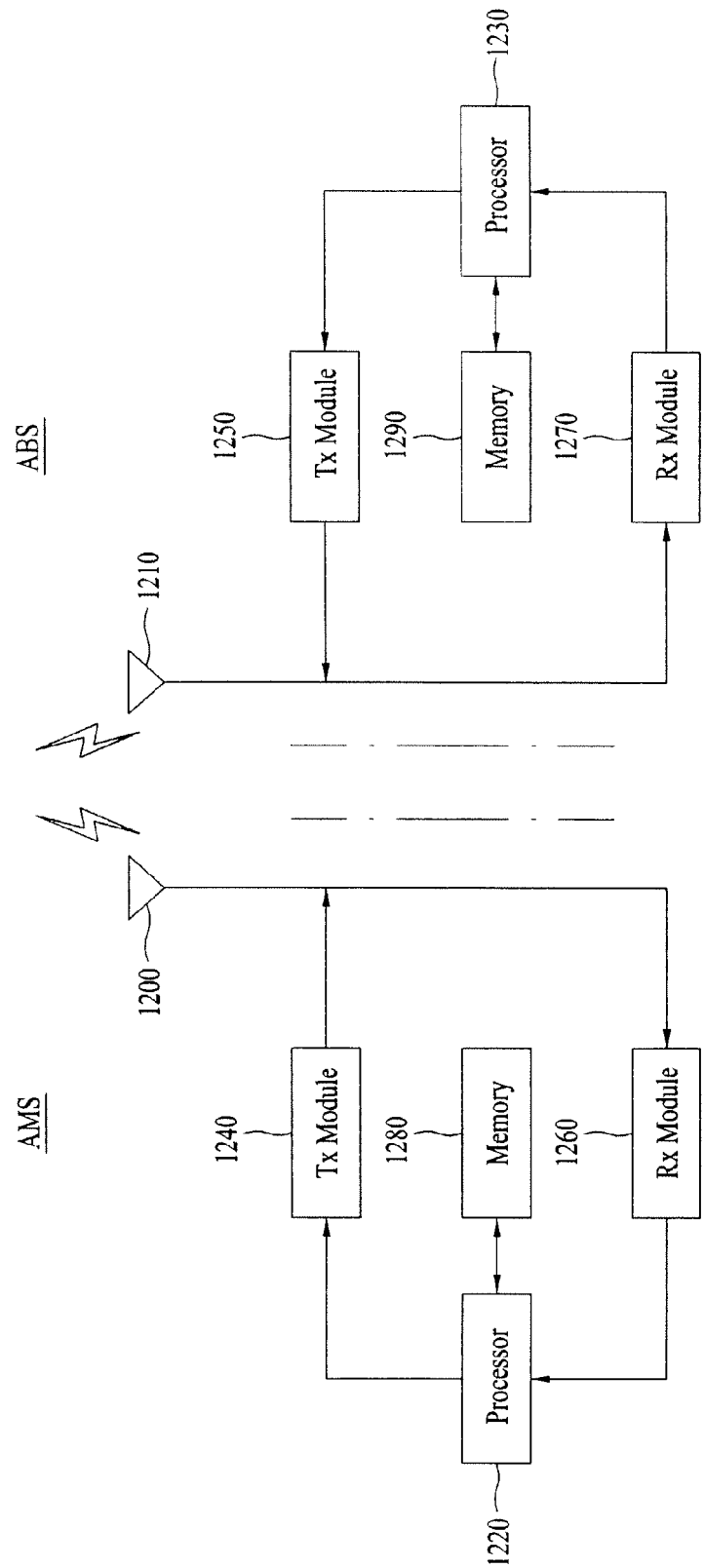
FIG. 12 is a diagram illustrating the configuration of an MS and a BS, through which the embodiments of the present invention of FIG. 3 to FIG. 11 are implemented, according to a further embodiment of the present invention.

FIG. 12 is a diagram illustrating the configuration of an MS and a BS, through which the embodiments of the present invention of FIG. 3 to FIG. 11 are implemented, according to a further embodiment of the present invention.

An AMS and an ABS include antennas 1200 and 1210 for transmitting/receiving information, data, signals, and/or messages, transmission (Tx) modules 1240 and 1250 for transmitting messages by controlling the antennas, reception (Rx) modules 1260 and 1270 for receiving messages by controlling the antennas, memories 780 and 790 for storing information associated with communication with the ABS, and processors 1220 and 1230 for controlling the Tx modules, the Rx modules, and the memories.

The antennas 1200 and 1210 transmit signals generated from the Tx modules 1240 and 1250 to the outside, or transfer radio signals received from the outside to the Rx modules 1260 and 1270. If a Multiple Input Multiple Output (MIMO) function is supported, each of the antennas may include two or more antennas.

The processors 1220 and 1230 typically control overall operation of the AMS and the ABS. Especially, the processors may carry out a control function for performing the embodiments of the present invention, a MAC frame variable control function based on service characteristics and propagation environments, an HO function, an authentication and encryption function, and the like.

The processors 1220 and 1230 of the AMS and the ABS may include HARQ modules and timers used during an HARQ operation. In other words, the AMS and the ABS may perform the above-described methods in conjunction with FIG. 3 to FIG. 11 using the processors and using the HARQ modules and timers included in the processors. The timers may be included inside or outside the processors.

The Tx modules 1240 and 1250 perform predetermined coding and modulation for signals and/or data, which are scheduled from the processors and transmitted to the outside, and then transfer the modulated signals and/or data to the antennas 1200 and 1210.

The Rx modules 1260 and 1270 perform decoding and demodulation of signals received through the antennas 1200 and 1210 from the outside, restore the signals into original data, and transfer the restored data to the processors 1220 and 1230.

The memories 1280 and 1290 may store programs required for signal processing and control of the processors and temporarily store input and output data (in case of the AMS, UL grant allocated from the ABS, SI, an STID, an FID, action time, region allocation information, frame offset information, etc.).

The memory may include at least one storage medium among a flash memory-type storage medium, a hard disk-type storage medium, a multimedia card micro-type storage medium, a card-type memory (e.g. an SD or XS memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disk.

Hereinbelow the functions of the AMS and the ABS will be descried in more detail.

The AMS and the ABS may perform the above operations described with reference to FIG. 3 to FIG. 11 using the functions of the above-described antennas 1200 and 1210, processors 1220 and 1230, Tx modules 1240 and 1250, Rx modules 1260 and 1270, and memories 1280 and 1290.

For example, the AMS and the ABS may perform the security capability exchange process and general capability exchange process described FIG. 3 and may generate TEKs using Equation 1. Each TEK may be generated by the processor or the Tx module of the AMS or the ABS.

The AMS and the ABS may perform the methods described in FIG. 4 to FIG. 11 using the constituent elements described in FIG. 12. For example, messages or radio signals may be transmitted and received through the Tx or Rx module, and generation of the AKs and TEKs, and analysis, processing, and management of messages to be transmitted may be performed by the processor.

Meanwhile, in the present invention, examples of the MS include a Personal Digital Assistant (PDA), a cellular phone, a Personal Communication Service (PCS) phone, a Global System for Mobile (GSM) phone, a Wideband CDMA (WCDMA) phone, a Mobile Broadband System (MBS) phone, a hand-held PC, a notebook PC, a smart phone, and a Multi Mode-Multi Band (MM-MB) terminal.

The embodiments according to the present invention can be implemented by various means, for example, hardware, firmware, software, or combinations thereof.

In case of hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In case of firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein. Claims which are not explicitly dependent on each other may be combined to provide the embodiments or new claims may be added through amendment after this application is filed.

INDUSTRIAL APPLICABILITY

The embodiments of the present invention may be applied to a variety of wireless access systems. Examples of the wireless access systems include a 3GPP (3rd Generation Partnership Project) system, a 3GPP2 system, and/or an IEEE 802.xx (Institute of Electrical and Electronic Engineers 802) system. The embodiments of the present invention may be applied not only to the various wireless access systems but also to all technical fields to which the various wireless access systems are applicable.

The invention claimed is:

1. A method for supporting a zone switched based handover of a mobile station (MS), the method comprising:
    transmitting, by the MS to a Legacy Zone (LZone) of a Target Base Station (TBS), a first ranging request message to perform a network reentry procedure for the zone switched based handover;
    receiving, by the MS from the LZone, a first ranging response message including a zone switch Time/Length/Value (TLV) parameter indicating a zone switching;
    transmitting, by the MS to an IEEE 802.16m zone (MZone) of the TBS, a second ranging request message to perform the zone switching;
    receiving, by the MS from the MZone, a second ranging response message including security association related information; and
    generating a Traffic Encryption Key (TEK) using the security association related information,
    wherein the LZone supports IEEE 802.16e system and the MZone supports an advanced system compared to the IEEE 802.16e system.

2. The method of claim 1, further comprising:
    receiving a neighbor base station advertisement (MOB_NBR-ADV) message including system information comprising a base station identifier (BS ID) of the TBS from a serving base station (SBS); and
    generating an Authentication Key (AK) using the BS ID of the SBS.

3. The method of claim 2, further comprising:
    transmitting a Subscriber Station Basic Capability (SBC) request message including security negotiation parameters supported by the MS; and
    receiving a SBC response message including security negotiation parameters supported by the TBS.

4. The method of claim 3, wherein the TEK is generated by using one or more of the AK, the BS ID, a nonce, a key count, and a Security Association ID (SAID).

5. A method for supporting a zone switched based handover of a mobile station (MS), the method comprising:
  receiving, via a Legacy Zone (LZone) of a target base station (TBS) from the MS, a first ranging request message transmitted to perform network reentry procedure for the zone switched based handover;
  transmitting, via the LZone from the MS, a first ranging response message including a zone switch Time/Length/Value (TLV) parameter indicating a zone switching;
  receiving, via an IEEE 802.16m zone (MZone) of the TBS from the MS, a second ranging request message to perform the zone switching;
  transmitting, via the MZone to the MS, a second ranging response message including security association related information; and
  generating a Traffic Encryption Key (TEK) using the security association related information,
  wherein the LZone supports IEEE 802.16e system and the MZone supports an advanced system compared to the IEEE 802.16e system.

6. The method of claim 5, further comprising:
  receiving a Subscriber Station Basic Capability (SBC) request message including security negotiation parameters supported by the MS; and
  transmitting a SBC response message including security negotiation parameters supported by the TBS.

7. The method of claim 6, wherein the TEK is generated by using one or more of an authentication key (AK), a base station identifier (BS ID) of the TBS, a nonce, a key count, and a Security Association ID (SAID).

8. A mobile station (MS) for supporting a zone switched based handover, the MS comprising:
  a transmission module;
  a reception module; and
  a processor to support the zone switched based handover,
  wherein the processor is configured to:
  transmit, by using the transmission module to a Legacy Zone (LZone) of a target base station (TBS), a first ranging request message to perform network reentry procedure for the zone switched based handover;
  receive, by using the reception module from the LZone, a first ranging response message including a zone switch Time/Length/Value (TLV) parameter indicating a zone switching;
  transmit, by using the transmission module to an IEEE 802.16m zone (MZone) of the TBS, a second ranging request message to perform the zone switching;
  receive, by using the reception module from the MZone, a second ranging response message including security association related information; and
  generate a Traffic Encryption Key (TEK) using the security association related information,
  wherein the LZone supports IEEE 802.16e system and the MZone supports an advanced system compared to the IEEE 802.16e system.

9. The mobile station of claim 8, wherein the processor further configured to:
  receive a neighbor base station advertisement (MOB_NBR-ADV) message including system information comprising a base station identifier (BS ID) of the TBS from a serving base station (SBS); and
  generate an Authentication Key (AK) using the BS ID of the SBS.

10. The mobile station of claim 9, wherein the processor further configured to:
  transmit a Subscriber Station Basic Capability (SBC) request message by using the transmission module, the SBC request message including security negotiation parameters supported by the MS; and
  receive a SBC response message by using the reception module, the SBC response message including security negotiation parameters supported by the TBS.

11. The mobile station of claim 10, wherein the TEK is generated by using one or more of the AK, the BS ID, a nonce, a key count, and a Security Association ID (SAID).

12. A target base station (TBS) for supporting a zone switched based handover of a mobile station (MS), the TBS comprising:
  a transmission module;
  a reception module: and
  a processor for supporting the zone switched based handover,
  wherein the processor is configured to:
  receive, by using the reception module via a Legacy Zone (LZone) of the TBS from the MS, a first ranging request message transmitted to perform network reentry procedure for the zone switched based handover;
  transmit, by using the transmission module via the LZone from the MS, a first ranging response message including a zone switch Time/Length/Value (TLV) parameter indicating a zone switching;
  receive, by using the reception module via an IEEE 802.16m zone (MZone) of the TBS from the MS, a second ranging request message to perform the zone switching;
  transmit, by using the transmission module via the MZone to the MS, a second ranging response message including security association related information; and
  generate a Traffic Encryption Key (TEK) using the security association related information, and
  wherein the LZone supports IEEE 802.16e system and the MZone supports an advanced system compared to the IEEE 802.16e system.

13. The target base station of claim 12, wherein the processor is further configured to:
  receive a Subscriber Station Basic Capability (SBC) request message by using the reception module, the SBC request message including security negotiation parameters supported by the MS; and
  transmit a SBC response message by using the transmission module, the SBC response message including security negotiation parameters supported by the TBS.

14. The target base station of claim 12, wherein the TEK is generated by using one or more of an authentication key (AK), a base station identifier (BS ID) of the TBS, a nonce, a key count, and a Security Association ID (SAID).

* * * * *